United States Patent

[11] 3,590,860

[72] Inventor Irving H. Stenner
Brockport, N.Y.
[21] Appl. No. 846,484
[22] Filed July 31, 1969
[45] Patented July 6, 1971
[73] Assignee Bernzomatic Corporation

[54] PRESSURE REGULATOR VALVE FOR L. P.
CARTRIDGES
4 Claims, 3 Drawing Figs.
[52] U.S. Cl. .................................................. 137/495,
137/505.39
[51] Int. Cl. ...................................................... G05d 16/06
[50] Field of Search........................................... 137/322,
505.4, 613, 495, 212, 505.42, 614.2, 614.11,
630.22, 505.41, 505.43, 505.39; 251/347, 350

[56] References Cited
UNITED STATES PATENTS
| | | | |
|---|---|---|---|
| 2,854,991 | 10/1958 | Webster ....................... | 137/322 |
| 2,868,224 | 1/1959 | Karlsson et al. .............. | 137/495 |
| 3,308,990 | 3/1967 | Klasson et al................. | 137/212 X |
| 3,315,844 | 4/1967 | Klasson et al................. | 137/212 X |
| 3,352,456 | 11/1967 | Swineford ..................... | 137/505.42 X |
| 3,422,448 | 1/1969 | Johnston ....................... | 137/212 X |

Primary Examiner—M. Cary Nelson
Assistant Examiner—Robert J. Miller
Attorney—Burgess, Dinklage & Sprung ABSTRACT: A finger-adjustable pressure regulator valve for regulating and shutting off the flow of gas from a disposable propane cartridge comprises a valve body containing a spring-loaded diaphragm operating on a strand tire core valve. The diaphragm spring is held by a threaded retainer which is adjustable from a full-open position to a full-closed position by rotation thereof with a control knob.

A retainer stop is threaded to the valve body and the spring retainer is threaded therein. During assembly, the retainer stop is threaded in place sufficiently to obtain the diaphragm seal and is then frozen in position as by jamming the threads or by the use of a plastic thread-lock compound.

Preferably the finger-adjustable control knob is a bonnet or cap that extends over the valve body, giving a pleasing integral appearance to the regulator. The cap is affixed to the spring retainer after it has been positioned at the maximum pressure control point and frozen, as by press fitting the cap to the retainer.

In a preferred embodiment, a push pin is associated with and extends through the control knob and serves to permit depression of the diaphragm spring to the full-open position, regardless of the setting of the control knob. This is useful in the starting up of certain equipment, such as a space heater, which should be internally flooded with gas to secure proper ignition.

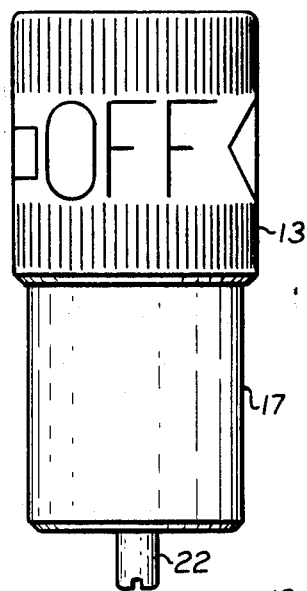
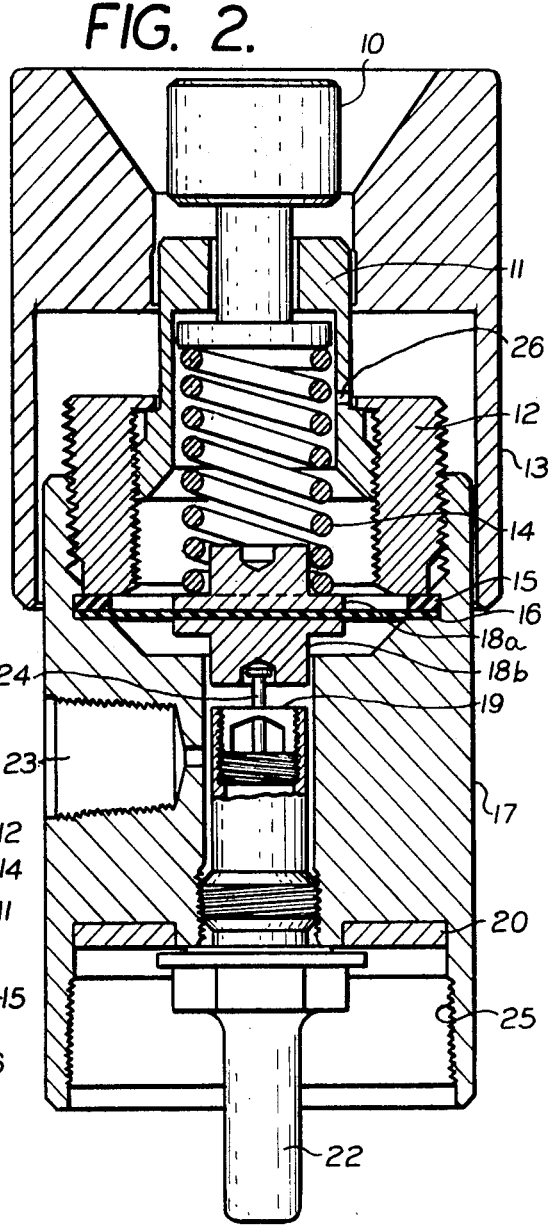
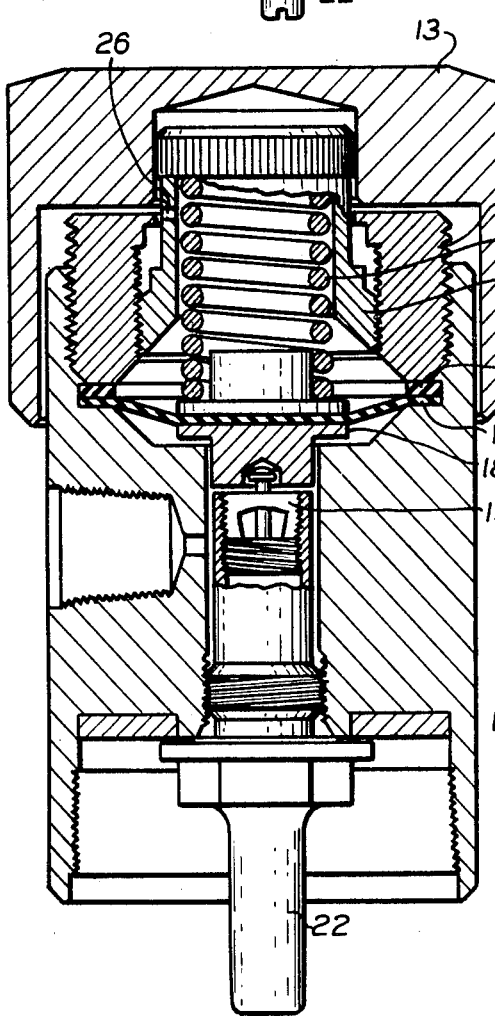

PRESSURE REGULATOR VALVE FOR L. P. CARTRIDGES

RELATED PATENT

This application is an improvement of the regulator described in U.S. Pat. No. 2,854,991 issued to M. E. Webster, Oct. 7, 1958. The elements of this and the patented regulator are essentially the same except for the means used to restrain the diaphragm spring and controllably adjust the tension thereon.

THIS INVENTION

Easy but accurate and safe finger adjustment of the regulators used with the disposable L. P. gas cartridges for torches, camp stoves, lanterns and the like, has long been desired. The present invention is addressed to this problem and proposes a regulator valve that functionally permits modulation of gas flow by easy finger rotation of a control knob or bonnet from full shut-off to full-open, with there being a positive stop of the rotation of the knob at the full-open position which is preset in the factory during the assembly of the regulator and cannot, for all practical purposes, be later changed by the user.

In addition, the appearance of the regulator of this invention is quite pleasant and solid-appearing.

With some equipment it is desirable to flood the equipment with gas prior to ignition or during warmup and to this end the regulator in a preferred embodiment has a finger-operated pushbutton in the control knob that can be depressed to hold the regulator valve in a full-open position when desired, regardless of the setting of the control knob.

THE DRAWINGS

FIG. 1 is a view in elevation of the regulator;

FIG. 2 is a cross-sectional view of the regulator of FIG. 1 taken along the centerline thereof; and FIG. 3 is a cross-sectional view similar to FIG. 2, showing an embodiment having a pushbutton for overriding the normal setting of the control knob.

Like parts have the same number in the drawings.

DESCRIPTION AND EXAMPLES

Referring to the drawings, 17 is the valve body and 13 is the rotatable control knob mounted thereon. The valve body has a threaded outlet 23 for connecting the regulator as by a hose or threaded pipe to the equipment to utilize the gas, such as a cooking stove. The inlet is threaded at 25 to permit it to be attached to a gas cartridge in a known manner, and contains a stem 22 to actuate the cartridge valve.

A tire core valve 19 is located in a valve chamber positioned between in the inlet and outlet passageways. Valve 19 has an actuating stem 24 that extends upwardly and engages the regulator diaphragm 16 which, as shown, has guides 18a and 18b affixed thereto which for manufacturing simplicity are identical, although the recess therein is only used on one side to center the valve stem 24, and the shoulder thereof is only used on the other side to center the actuating spring 14.

The diaphragm 16 is held in the diaphragm chamber by means of a threaded retainer 12 acting against a sealing washer 15. The retainer or stop 12 is desirably frozen in position by the application of a stud-lock compound or anaerobic plastic adhesive to the external threads thereof.

The regulator diaphragm 16 is shown in a partly open position in FIG. 3 and in the closed position in FIG. 2, wherein there is a force acting on stem 24. The upper side thereof is exposed to the ambient atmosphere via opening 26 and the gap between the knob 13 and the valve body.

The control knob 13 is attached to the upper part of spring retainer 11, as by a press fit after the spring retainer 11 is adjusted to the maximum pressure control point, which thereafter prevents any high-pressure control adjustment and disassembly of the valve without considerable effort. This arrangement is considered to be a significant feature of this invention.

The spring retainer 11 is threadably mounted in stop 12. It can be seen that in operation by rotation of knob 13 the position of the retainer and thus the compression of spring 14 can be adjusted to thereby vary the action of the diaphragm on valve 19 and modulate the flow of gas therethrough.

FIG. 2 shows an embodiment wherein the bonnet 13 is modified by having a recessed opening into which fits a pushbutton 10, the lower portion of which extends through retainer 11 and acts against spring 14. When button 10 is depressed by finger pressure, it compresses spring 14 and causes diaphragm 16 to act against valve 19 fully. The recessing of the button into the control knob, as shown, helps to prevent accidental depressing of the button.

I claim:

1. A finger-adjustable pressure regulator for regulating and shutting-off the flow of a fuel delivered from a container containing liquefied fuel gas, comprising:
   a. a valve body having an inlet adapted to receive fuel from said container, an outlet, a diaphragm chamber and a valve chamber positioned between said inlet and outlet and communicating therewith and with said diaphragm chamber;
   b. a flexible diaphragm in said diaphragm chamber, the inner side of which is subjected to the pressure at said outlet and the outer side of which is subjected to ambient pressure;
   c. a regulator valve seated in said valve chamber and adapted in the closed position to cut off the flow of gas therethrough;
   d. a valve stem connected to said valve and adapted to be actuated by the inner side of said diaphragm;
   e. an actuating spring operating against the outer side of said diaphragm;
   f. an adjustable spring retainer positioned to contain said spring against said diaphragm in a manner such that said diaphragm operates to effect movement of said valve from full-open to full-closed;
   g. stop means associated with said spring retainer and adapted to restrict the upward motion thereof; and
   h. a finger-adjustable control knob operating on said retainer and adapted to permit graduated positioning thereof at positions intermediate of said full-open and full-closed positions.

2. The pressure regulator of claim 1 comprising in addition:
   i. a push pin associated with and extending through said knob and adapted when depressed to compress said spring to the full-open position, regardless of the setting of said control knob.

3. The regulator of claim 1 wherein said inlet is threaded and adapted to mate with threads on the neck of said container and said valve is adapted to be mounted on said container and form a pressuretight seal therewith.

4. The regulator of claim 1 wherein said valve body is circular and said inlet, valve chamber, diaphragm chamber, spring and spring retainer have a common centerline, wherein said spring retainer stop means for restricting the upward motion of said spring retainer is threadably mounted on said valve body and said spring retainer is threadably mounted thereon, wherein said control knob is a cap rigidly affixed to said spring retainer with the walls of said cap extending over said valve body and being free to rotate thereabout, and wherein, after assembly and adjustment of said stop means, the rotation thereof with respect to said valve body is frozen, with said cap thereafter being affixed to said spring retainer.

Dedication 3,590,860.—*Irving H. Stenner*, Brockport, N.Y. PRESSURE REGULATOR VALVE FOR L.P. CARTRIDGES. Patent dated July 6, 1971. Dedication filed Feb. 4, 1972, by the assignee, *Bernzomatic Corporation*. Hereby dedicates to the Public the entire term of said patent.
[*Official Gazette July 18, 1972.*]